J. W. Larimore,
Caster & Cake Dish.
No. 86,422. Patented Feb. 2, 1869.
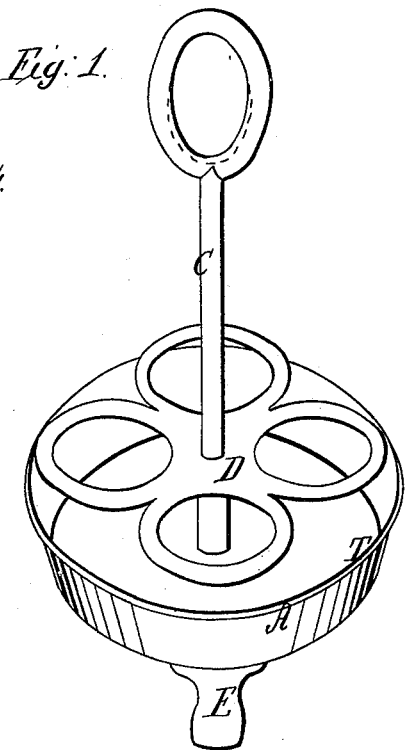
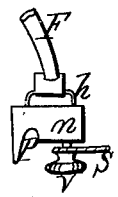
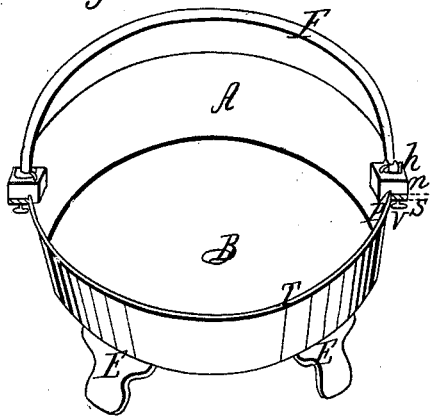
Witnesses:
G. L. Chapin
A. Hayward
Inventor:
J. W. Larimore

J. W. LARIMORE, OF CHICAGO, ILLINOIS.

Letters Patent No. 86,422, dated February 2, 1869; antedated January 22, 1869.

IMPROVED CASTER, AND FRUIT AND CAKE-DISH.

The Schedule referred to in these Letters Patent and making part of the same.

*To all whom it may concern:*

Be it known that I, J. W. LARIMORE, of Chicago, in the county of Cook, and State of Illinois, have invented a new and useful Improvement in a Combined Caster, and Fruit and Cake-Dish; and I do hereby declare that the following is a full, clear, and exact description of the construction of the same, reference being had to the accompanying drawings, and letters marked thereon, making a part of this description, in which—

Figure 1 is a perspective representation of my invention, arranged to be used as a caster.

Figure 2, a representation of the device as used as a fruit and cake-basket.

Figure 3, an enlarged view of one end of the handle, showing how it is fastened to the rim of the basket.

Figure 4, a representation of the screw-stopper removed from the bottom of the cake-basket, preparatory to inserting the stem of the caster-handle in its place.

The object of the present invention is to combine, in one article of table-ware, as nearly as possible, a caster and fruit and cake-basket, and, in doing this, to so arrange the various parts of the device that it may be readily changed from one article to the other, and at the same time have each piece of ware perfect in itself, and present the appearance of having been made especially for a single purpose.

By this means I expect to provide the fruit and cake-basket at but a little cost above that of manufacturing the caster alone; and as no two of the articles are usually needed at the same time, a considerable saving in the cost of table-ware is made, and the articles are brought within the reach of those not having sufficient room to store any considerable quantity of plate.

Fig. 1 represents a caster, so constructed that the handle C and bottle-holder D may be removed from the dish A, the stem of the handle passing through the centre of the bottle-holder, and fastening by a screw to the bottom of said dish A, thus permitting the bottle-holder to turn in the usual manner.

Fig. 2 represents a fruit or cake-basket, which is made of silver or other suitable material, and it has rigidly attached to its bottom a suitable number of feet, E, to support it; and it has also attached to it a removable handle, with a novel attachment, as shown more clearly at fig. 3.

A metal seat, n, is hinged to the handle F at h, and it has a notch, P, made in its under side, to fit the top of the rim T of the basket, or dish; and it has also a plate, S, pivoted to its outer part by a screw, v, which screw is used to clamp the plate firmly against the under side of the rim T, and thus hold the handle to the basket.

I am not particular, however, as to the means used to secure the handle, as other devices may be employed, and answer the purpose equally as well.

To change the caster into a fruit-basket, loosen the screw at the lower end of the handle C, at the bottom of the dish A; then attach the handle F to the rim by means of the fastening above described, and place the screw-stopper B, fig. 4, in the opening from which the stem of the handle C has been removed, and the fruit or cake-basket is complete.

To change the fruit or cake-basket back into a caster, remove the screw-stopper B, as at fig. 4, and loosen the screw v, which will permit the plate S to swing out, as at fig. 3, and the handle F to be removed.

The stem of the handle C should then be put vertically through the centre of the bottle-holder D, and the screw on its lower end turned into the opening at the centre of the dish A, and the caster will be complete, as first described.

The device, as shown in the drawings, has a very simple construction, and represents the plainest style of table-ware, but the various parts may be ornamented to suit the taste, and made in various patterns, accordingly as the demand for highly-finished ware of this kind may require.

The same kind of material should be used for all parts of the invention, to insure a uniform finish.

Having thus described my invention,

I claim, and desire to secure by Letters Patent—

The combination of the dish A, handle F, holder D, handle C, and screw-stopper B, the whole being arranged to be changed into different kinds of table-ware, substantially as set forth and shown.

J. W. LARIMORE.

Witnesses:
A. HAYWARD,
GEO. L. CHAPIN.